(12) United States Patent
Escalier

(10) Patent No.: US 9,885,632 B2
(45) Date of Patent: Feb. 6, 2018

(54) OPTICAL INSTRUMENT FOR LOCATING AT LEAST ONE CHARACTERISTIC POINT OF AN OPHTHALMIC LENS

(71) Applicant: ESSILOR INTERNATIONAL (COMPAGNIE GENERALE D'OPTIQUE), Charenton-le-Pont (FR)

(72) Inventor: Guilhem Escalier, Charenton le Pont (FR)

(73) Assignee: ESSILOR INTERNATIONAL (COMPAGNIE GENERALE D'OPTIQUE, Charenton-le-Pont (FR)

( * ) Notice: Subject to any disclaimer, the term of this patent is extended or adjusted under 35 U.S.C. 154(b) by 0 days.

(21) Appl. No.: 15/121,296

(22) PCT Filed: Feb. 26, 2015

(86) PCT No.: PCT/FR2015/050466
§ 371 (c)(1),
(2) Date: Aug. 24, 2016

(87) PCT Pub. No.: WO2015/128590
PCT Pub. Date: Sep. 3, 2015

(65) Prior Publication Data
US 2017/0016803 A1 Jan. 19, 2017

(30) Foreign Application Priority Data
Feb. 27, 2014 (FR) ..................... 14 51615

(51) Int. Cl.
*G01B 9/00* (2006.01)
*G01M 11/02* (2006.01)

(52) U.S. Cl.
CPC .... *G01M 11/0264* (2013.01); *G01M 11/0207* (2013.01); *G01M 11/0214* (2013.01); *G01M 11/0235* (2013.01)

(58) Field of Classification Search
CPC ......... G01M 11/0221; G01M 11/0235; G01M 11/0228; G01M 11/0207; B24B 13/0055
(Continued)

(56) References Cited

U.S. PATENT DOCUMENTS 6,888,626 B2 * 5/2005 Levecq .............. G01M 11/0235
356/124
7,324,190 B2 1/2008 Demarchi et al.
(Continued)

FOREIGN PATENT DOCUMENTS

EP 0856728 8/1998
EP 1061329 12/2000
(Continued)

OTHER PUBLICATIONS

International Search Report PCT/FR2014/050465 dated May 22, 2015.
(Continued)

*Primary Examiner* — Tarifur Chowdhury
*Assistant Examiner* — Md M Rahman
(74) *Attorney, Agent, or Firm* — Young & Thompson

(57) ABSTRACT

An instrument has a light-emitting and light-receiving assembly including an image capture unit and image processing unit; a backscatterer and an opening provided therein; a support for receiving an ophthalmic lens between the assembly and backscatterer, the assembly, support and backscatterer placed so that an incident light beam traverses the lens, strikes the backscatterer, returns and re-traverses the lens to arrive at the capture unit; the light-receiving assembly, the support, backscatterer and opening configured so that the assembly receives light from the beam; and the opening and a drive device for cyclically driving and making the backscatterer perform an identical movement in each cycle, configured so that a fixed zone opposite the backscat-
(Continued)

terer includes at least one part of which, over the course of a cycle, every point is at times perpendicular to the opening and at times perpendicular to a solid portion part of the backscatterer.

20 Claims, 7 Drawing Sheets

(58) Field of Classification Search
USPC .......................................................... 356/127
See application file for complete search history.

(56) References Cited

U.S. PATENT DOCUMENTS

| 8,593,623 | B2 | 11/2013 | Levecq et al. |
| 2006/0170865 | A1* | 8/2006 | Hirohara ............... A61B 3/0025 351/205 |
| 2006/0192945 | A1 | 8/2006 | Hornauer et al. |
| 2007/0091262 | A1 | 4/2007 | Watanabe et al. |
| 2010/0020406 | A1* | 1/2010 | Rana ...................... G02B 25/04 359/643 |
| 2014/0257076 | A1* | 9/2014 | Shimozato ............. A61B 3/165 600/401 |

FOREIGN PATENT DOCUMENTS

| EP | 1093907 | 4/2001 |
| EP | 1613450 | 6/2006 |
| EP | 1739472 | 1/2007 |
| EP | 1 997 585 A1 | 12/2008 |
| EP | 2 239 552 A1 | 10/2010 |
| FR | 2 825 466 A1 | 12/2002 |
| WO | 95/34800 A1 | 12/1995 |

OTHER PUBLICATIONS

International Search Report, dated May 26, 2015, from corresponding PCT Application.

* cited by examiner

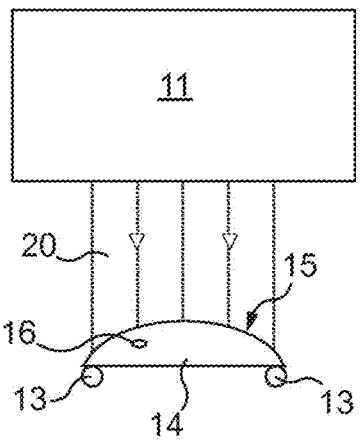
Fig. 1
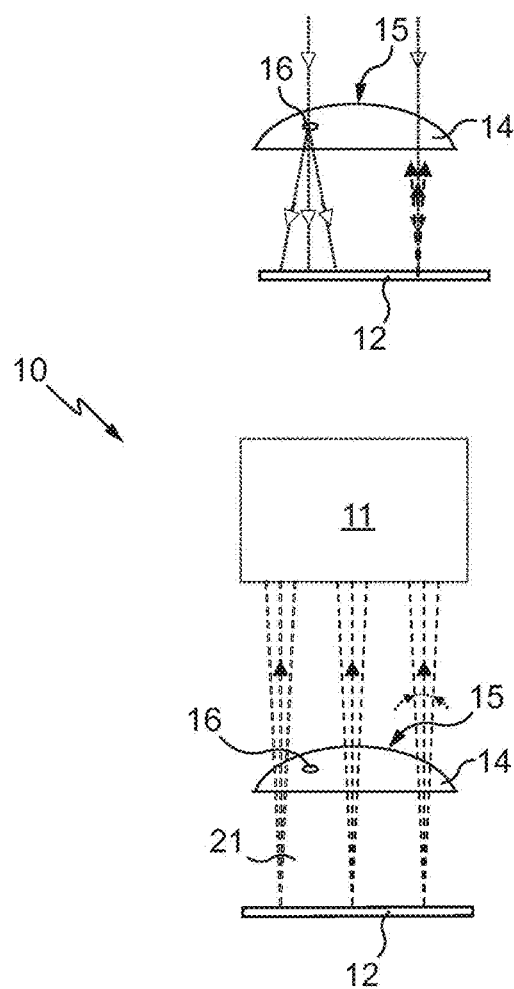
Fig. 2
Fig. 3

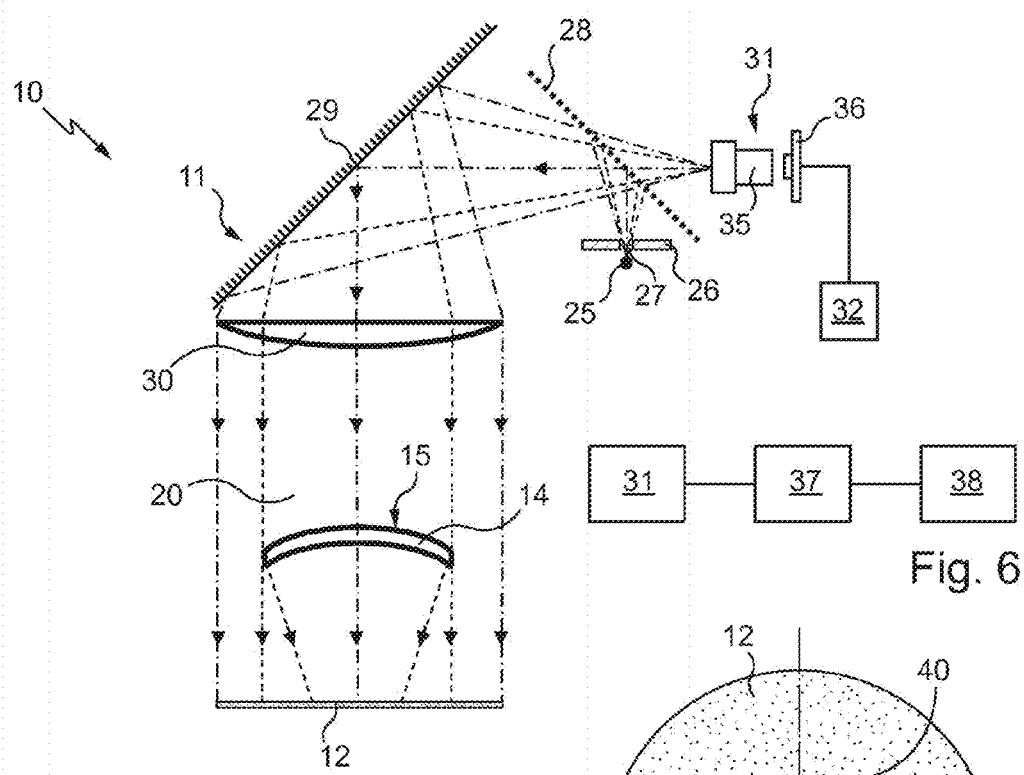
Fig. 4
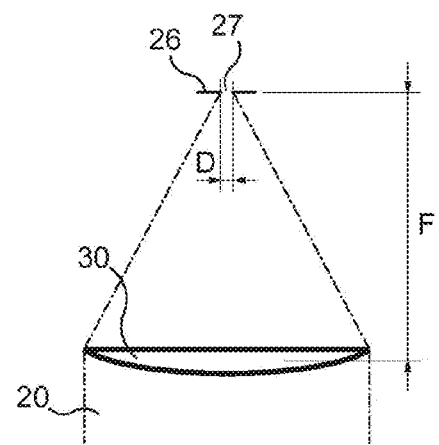
Fig. 5
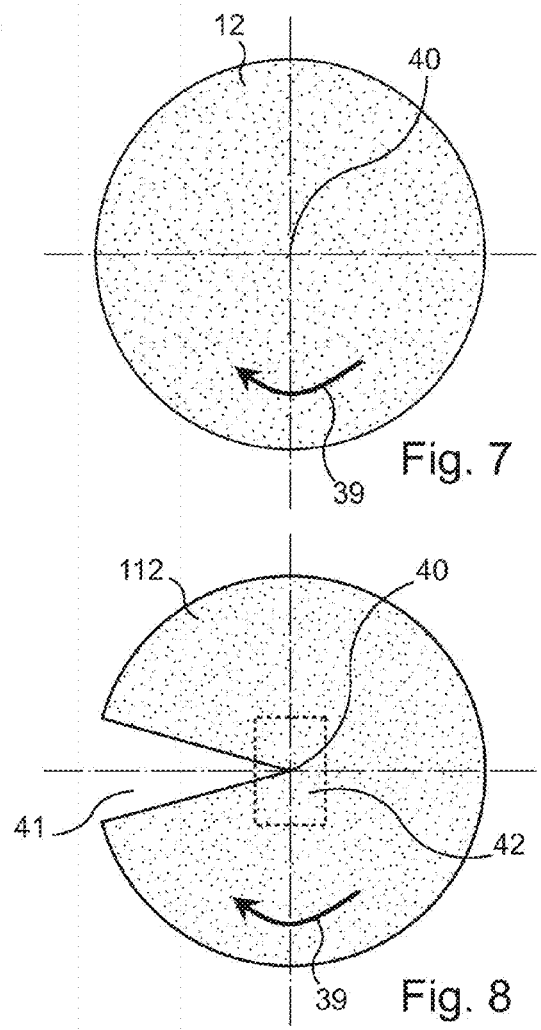
Fig. 6
Fig. 7
Fig. 8

OPTICAL INSTRUMENT FOR LOCATING AT LEAST ONE CHARACTERISTIC POINT OF AN OPHTHALMIC LENS

FIELD OF THE INVENTION

The invention deals with optical instruments for charting at least one characteristic point of an ophthalmic lens.

PRIOR ART

It is known that in order to undertake the edging of an ophthalmic lens, that is to say to trim the edges of the ophthalmic lens to the shape of the frame into which it is to be placed, it is necessary to ascertain the location of one or more characteristic point(s) of the ophthalmic lens, for example its Prism Reference Point (PRP), its reference point for Far Vision (FV) or its reference point for Near Vision (NV).

To ascertain the location of the characteristic point(s), use is generally made of indications placed on the ophthalmic lens by its manufacturer, for example in the form of ink markings and/or of micro-engravings.

It is also possible to chart the characteristic point(s) directly on the basis of the optical properties of the ophthalmic lens, for example with a focimeter or with an optical deflectometry instrument employing the Hartmann or Shack-Hartmann method in which light is made to pass through the ophthalmic lens and thereafter through an opaque plate drilled with holes at regular intervals and then the light that has passed through the opaque plate is analysed.

In general, instruments for identifying and locating the indications placed on the ophthalmic lens by its manufacturer are distinct from the instruments for charting the characteristic point(s) on the basis of the optical properties of the ophthalmic lens.

European patent application EP 1 997 585 proposes an optical instrument designed to identify and locate markings of an ophthalmic lens or to chart the optical center of an ophthalmic lens on the basis of its optical properties. The instrument described by this document comprises:
- a light emission and reception assembly, comprising an image capture unit and a display unit linked to the image capture unit;
- a retroreflector in two parts, one of which, at the center, is fixed, and the other, annular with the same center, is rotary;
- a support configured to receive the ophthalmic lens between the light emission and reception assembly and the retroreflector, with the light emission and reception assembly, the support and the retroreflector which are disposed so that an incident light beam issuing from the light emission and reception assembly passes through the ophthalmic lens, encounters the retroreflector, returns towards the ophthalmic lens, passes once again through the ophthalmic lens and returns to the light emission and reception assembly so as to reach the image capture unit, which is configured to provide the display unit with images to identify and to locate the markings liable to be present on the ophthalmic lens; and
- a light reception and analysis assembly, whose vertex is the fixed central part of the retroreflector, with the support and the retroreflector which are configured so that the light reception and analysis assembly receives light, of the incident beam, that has passed through the ophthalmic lens, through the aperture formed by the center of the annular part of the retroreflector and through the fixed central part of the retroreflector, the light reception and analysis assembly being configured to chart the optical center of the ophthalmic lens on the basis of the light received.

SUBJECT OF THE INVENTION

The invention is aimed at providing an optical instrument of the same kind but more efficacious.

The invention proposes for this purpose an optical instrument for charting at least one characteristic point of an ophthalmic lens, comprising:
- a light emission and reception assembly, comprising an image capture unit and an image utilization unit linked to the image capture unit;
- a light return unit;
- a support configured to receive said ophthalmic lens between said light emission and reception assembly and said light return unit, with said light emission and reception assembly, said support and said light return unit which are disposed so that an incident light beam issuing from said light emission and reception assembly passes through said ophthalmic lens, encounters said light return unit, returns towards said ophthalmic lens, passes once again through said ophthalmic lens and returns to said light emission and reception assembly so as to reach the image capture unit, which is configured to provide the image utilization unit with images so as to identify and locate predetermined indications liable to be present on the ophthalmic lens so as to give the location of said at least one characteristic point;
- an aperture made in said light return unit; and
- a light reception and analysis assembly, situated on the side of the light return unit opposite to said support, with said support, said light return unit and said aperture which are configured so that said light reception and analysis assembly receives light, from said incident beam, that has passed through said ophthalmic lens and through said aperture, said light reception and analysis assembly being configured to chart said at least one characteristic point of the ophthalmic lens on the basis of the light received;

characterized in that said aperture and a device for cyclic driving of the light return unit, making the light return unit make one and the same motion at each cycle, are configured so that a fixed zone facing the light return unit comprises at least one part, each site of which, in the course of a cycle, is at times in line with said aperture and at times in line with a solid part of the light return unit.

Given that the light return unit makes one and the same motion at each cycle, the light return unit returns to the same location at the end of a cycle.

If the cyclic driving device translates the light return unit to-and-fro, the same motion performed at each cycle is for example an outward-return movement of a certain length along the predetermined direction.

If the cyclic driving device makes the light return unit rotate about a predetermined center of rotation, the same motion performed at each cycle is for example an outward-return movement of a certain angular extent about the center of rotation (alternating rotation motion) or a complete revolution about the center of rotation (continuous rotation motion).

It will be noted that in the optical instrument described by document EP 1 997 585, where the light retroreflector is in two parts, one of which, at the center, is fixed, and the other, annular with the same center, performs a continuous rotation motion; any fixed zone facing the retroreflector comprises exclusively, on the one hand, a part which is permanently in line with the aperture formed by the center of the annular part of the retroreflector and, on the other hand, a part which is permanently in line with the annular part of the retroreflector. There is no part each site of which, in the course of a cycle, is at times in line with the aperture and at times in line with a solid part of the retroreflector. The images displayed by the display unit exhibit a central void given by the aperture and this void hinders the visibility of the markings situated at the center of the ophthalmic lens (see in particular FIG. 12 of document EP 1 997 585).

On the contrary, in the instrument according to the invention, as explained hereinafter, the images taken by the image sensor comprise at least one part whose brightness is intermediate between the brightness given by a solid part of the light return unit and the brightness given by the aperture.

The at least one part of the image with intermediate brightness is not dark and does not therefore form a void which hinders the identifying and locating of the predetermined indications liable to be present on the ophthalmic lens so as to give the location of said at least one characteristic point.

The aperture of the light return unit can thus be relatively large, and consequently more light can be transmitted towards the light reception and analysis assembly.

The optical instrument according to the invention therefore offers both easier identification and easier locating of the predetermined indications liable to be present on the ophthalmic lens and better capabilities for light transmission towards the light reception and analysis assembly, to the benefit of this assembly's analysis capabilities.

It will now be explained why the images taken by the image sensor comprise at least one part whose brightness is intermediate between the brightness given by a solid part of the light return unit and the brightness given by the aperture.

In the fixed zone, the at least one part, each site of which, in the course of a cycle, is at times in line with the aperture and at times in line with a solid part of the light return unit, if this part is situated on the side of the support, at any instant:
  the sub-part which is in line with a solid part of the light return unit is traversed by light heading towards the light emission and reception assembly, and
  the sub-part which is in line with the aperture is not traversed by light heading towards the light emission and reception assembly, or in any event is traversed by such light with low intensity.

Consequently, the light passing through the at least one part of the fixed zone in the direction of the light emission and reception assembly has an average intensity intermediate between:
  the intensity of light passing through a part permanently in line with a solid part of the light return unit; and
  the intensity of light (low or zero) passing through a part permanently in line with the aperture of the light return unit.

Because the light received by the image sensor originates from the light return unit, and because the image sensor is fixed, the images taken by the image sensor comprise, in view of the average intensity of light passing through the at least one part of the fixed zone, at least one part whose brightness is intermediate between the brightness given by a solid part of the light return unit and the brightness given by the aperture.

According to advantageous characteristics, said aperture and said device for cyclic driving of the light return unit are configured so that said fixed zone facing the light return unit does not comprise any part which, in the course of a cycle, is permanently in line with said aperture.

Thus the images taken by the image sensor do not exhibit any void given by the aperture of the light return unit.

In a first advantageous embodiment, the device for cyclic driving of the light return unit is configured to rotate the light return unit about a predetermined center of rotation; and said aperture is configured so that the center of rotation (40) of the light return unit is elsewhere than in the aperture.

According to advantageous characteristics of this first embodiment:
  said light return unit has a circular contour and said aperture is angular-sector-shaped; or
  said light return unit has a circular contour and said aperture is spiral-shaped.

In a second advantageous embodiment, the device for cyclic driving of the light return unit is configured to rotate the light return unit about a predetermined center of rotation; and said aperture is configured so that the center of rotation of the light return unit is in the aperture whilst the contour of the aperture is other than axisymmetric about the center of rotation.

In a third advantageous embodiment, the device for cyclic driving of the light return unit is configured to translate the light return unit to-and-fro along a predetermined direction.

According to advantageous characteristics of this third embodiment, the light return unit has rectangular contour and said aperture is rectangle-shaped.

According to advantageous characteristics of implementation of the instrument according to the invention:
  the device for cyclic driving of the light return unit and the image capture unit comprised by said light emission and reception assembly, are linked to a control device configured so that each time interval for which the image capture unit takes an image has a duration for which the light return unit makes an integer number of cycle(s);
  the device for cyclic driving of the light return unit and a light source comprised by said light emission and reception assembly, are linked to a control device configured to make said light source emit flashes each having a duration for which the light return unit makes an integer number of cycle(s);
  said light reception and analysis assembly comprises a device for measuring deflection of said light, of the incident beam, that has passed through said ophthalmic lens and through said aperture;
  said light reception and analysis assembly comprises a matrix of patterns that is illuminated by said light, of the incident beam, that has passed through said ophthalmic lens and through said aperture, another image capture unit illuminated by the light that has passed through the matrix of patterns, and an analysis device for analysing the images captured by said other image capture unit so as to chart said at least one characteristic point of the ophthalmic lens;
  said analysis device for analysing the images captured by said other image capture unit is linked to a display unit for displaying said at least one characteristic point of the ophthalmic lens;

said analysis device for analysing the images captured by said other image capture unit is linked to a device for automatic positioning of a centering pin on said ophthalmic lens; and/or said light reception and analysis assembly furthermore comprises a light source configured to emit light which passes through said aperture and is received by said light emission and reception assembly; and said light reception and analysis assembly comprises a mask exhibiting holes forming at least one predetermined pattern, holes through which said light emitted by said light source comprised by said light reception and analysis assembly passes.

BRIEF DESCRIPTION OF THE DRAWINGS

The disclosure of the invention will now continue with the detailed description, given by way of nonlimiting illustration, of exemplary embodiments, with reference to the appended drawings. In the latter:

FIG. 1 is a very schematic view showing a light emission and reception assembly as well as a support comprised by a first embodiment of an optical instrument useful for the comprehension of the invention, with an ophthalmic lens exhibiting micro-engravings on one of its faces, this ophthalmic lens being received on the support in a position where the face on which the micro-engravings are present is facing the light emission and reception assembly;

FIG. 2 is a very schematic view showing a backscatterer that this optical instrument includes and the ophthalmic lens received on the support;

FIG. 3 is a very schematic view showing the light emission and reception assembly, the ophthalmic lens and the backscatterer and the path of the light from the backscatterer to the light emission and reception assembly;

FIG. 4 is a schematic view of the first embodiment of the instrument useful for the comprehension of the invention, showing in a detailed manner the light emission and reception assembly;

FIG. 5 is a schematic view illustrating certain geometric characteristics of the point light source and of the collimation unit;

FIG. 6 is a block diagram showing elements linked to the image capture unit to allow the automatic positioning of a centering pin on the ophthalmic lens;

FIG. 7 is a plan view of the backscatterer;

FIG. 8 is a view similar to FIG. 7, but for a second embodiment of the optical instrument according to the invention;

DETAILED DESCRIPTION OF EXEMPLARY EMBODIMENTS

Figure 9:
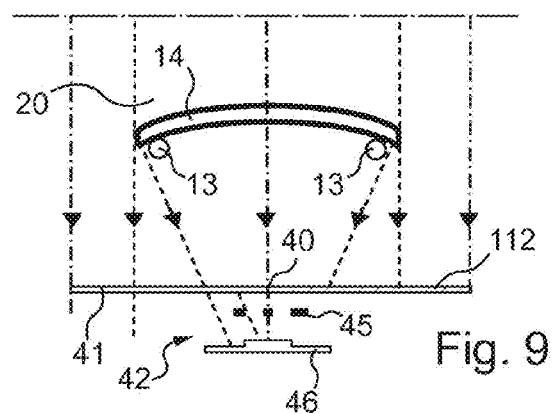
FIG. 9 is a schematic view similar to the bottom of FIG. 4 but for the second embodiment of the optical instrument according to the invention.

The optical instrument 10 illustrated in FIGS. 1 to 7 conforms to a first embodiment of an optical instrument useful for the comprehension of the invention.

This optical instrument 10 comprises a light emission and reception assembly 11, a backscatterer 12 and a support 13 (FIG. 1) which is configured to receive an ophthalmic lens 14 between the assembly 11 and the backscatterer 12 in a position where its face 15 on which micro-engravings 16 are present is facing the light emission and reception assembly 11.

The micro-engravings 16 are of small local variations of thickness of the lens or of small local variations of the optical index.

Diverse techniques make it possible to render micro-engravings 16 present on a face of an ophthalmic lens: slight thickenings when the micro-engravings are molded with the ophthalmic lens, slight hollows generated by laser or alterations of the material modifying its optical index locally.

When a coherent light beam encounters a micro-engraving 16, its phase is locally modified by the micro-engraving.

This local variation of the phase causes the light beam to diffract.

In the case of a spatially coherent light beam, the diffraction is rendered visible by a local modification of the intensity (Fresnel diffraction).

The micro-engravings 16 serve to chart characteristic points of the ophthalmic lens 14, for example its Prism Reference Point (PRP).

The light emission and reception assembly 11 emits a beam 20 (FIG. 1) of spatially coherent collimated light.

As shown on the left of FIG. 2, when the beam 20 encounters a micro-engraving 16, the light is diffracted locally.

The projection of the light that has passed through the lens 14 on the backscatterer 12 exhibits intensity variations due to the diffraction of the light caused by the micro-engravings 16.

The beam 20 image projected on the backscatterer 12 therefore exhibits variations of intensity of similar forms to those of the micro-engravings 16.

As shown on the right of FIG. 2, the backscatterer 12 returns the light which has reached it in the same direction with a slight scatter.

The light beam 21 returned by the backscatterer is spatially incoherent because of this slight scattering.

As may be seen in FIG. 3, the light beam 21 thus emitted by the backscatterer 12 passes through the ophthalmic lens 14 without or almost without being modified by the micro-engravings 16, and reaches the light emission and reception assembly 11.

In the preceding description, no mention was made of the prismatic deviation that the incident beam 20 undergoes when it passes through the lens and that the beam 21 emitted by the backscatterer 12 undergoes when it once again passes through the lens.

This is because these two successive prismatic deviations compensate one another perfectly.

Thus, whereas the image of the micro-engravings 16 formed on the backscatterer 12 is deformed by the prismatic deviation, the image of the backscatterer 12 seen through the ophthalmic lens 14 by the assembly 11 is deformed in exactly the inverse way.

Therefore, the image of the backscatterer 12 seen by the assembly 11 contains an exact representation of the micro-engravings 16.

The fact that the optical beam passing through the ophthalmic lens 14 is collimated and spatially coherent makes it possible to obtain a very contrasted projection of the micro-engravings 16 on the backscatterer 12.

The support 13 is positioned so that the projection of the micro-engravings 16 on the backscatterer 12 is easy to observe: the distance between the ophthalmic lens 14 and the backscatterer 12 is sufficiently small for the projection on the backscatterer 12 to remain sharp (if this distance is too large the image would be blurred because of the diffraction due to the micro-engravings 16) and sufficiently large for the projection of the micro-engravings 16 to be large enough to be observed.

The light emission and reception assembly 11 will now be described in detail with reference to FIG. 4.

In the illustrated example, the assembly 11 includes: an extended light source 25; a diaphragm 26 containing a pinhole 27; a semi-reflecting plate 28; a return mirror 29; a collimating lens 30; a video camera 31; and a display unit 32 linked to the video camera 31.

The diaphragm 26 and the objective 35 of the video camera 31 are located on either side of the semi-reflecting plate 28, in conjugate places, i.e. they are seen from the point of view of the return mirror 29 as being located in one and the same place.

This place is chosen to be the focus of the collimating lens 30. Thus, each of the two conjugate places corresponds to the focus of the collimating lens 30.

The pinhole 27 of the diaphragm 26 may therefore be considered to be placed at a first focus of the collimating lens 30 and the objective 35 of the video camera 31 may be considered to be placed at a second focus of the collimating lens 30.

The extended light source 25 is placed as close as possible to the diaphragm 26, for example less than 0.5 mm away, so that the pinhole 27 of the diaphragm 26 forms a point light source.

The light emitted by this point source reflects from the semi-reflecting plate 28 then from the return mirror 29 and passes through the collimating lens 30.

Because the pinhole 27 is located at the focus of the collimating lens 30, the beam 20 emerging from the lens 30 is collimated, i.e. all its rays are oriented parallel to one another.

FIG. 5 schematically shows the focal length F of the collimating lens 30 and the diameter D of the pinhole 27, i.e. the diameter of the point light source formed by the extended light source 25 and by the diaphragm 26.

In practice, the point light source may be formed by a commercially available component combining an LED forming the extended light source 25 and a diaphragm 26.

For the light flux to be sufficient, the diameter D is at least 10 µm or even at least 20 µm. The maximum values provided for the diameter D are described below.

After it has passed through the ophthalmic lens 14, the light of the beam 21 issuing from the backscatterer 12 passes through the collimating lens 30, is reflected by the return mirror 29, passes through the semi-reflecting plate 28 and reaches the objective 35 of the video camera 31.

This objective is focused so that the sensor 36 of the video camera 31 takes images of the backscatterer 12.

These images are displayed on the display unit 32, which is linked to the video camera 31.

Thus, an observer looking at the display unit 32 sees images allowing the micro-engravings 16 present on the face 15 of the ophthalmic lens 14 to be identified and located.

This makes it possible for an operator to determine where the micro-engravings 16 are on the ophthalmic lens 14 and therefore where the optical center and the axis of the spherical power of this ophthalmic lens are located, these parameters for example being useful to the user when he wants to edge the ophthalmic lens 14, i.e. trim the edges of the ophthalmic lens 14 to the shape of the frame in which it is to be fitted.

In practice, the centering pin used to fix the ophthalmic lens 15 to the edging machine is placed in the instrument 10 by virtue of the micro-engravings 16 thus viewed. The centering pin may be placed manually by the operator.

FIG. 6 shows elements allowing the centering pin to be placed automatically.

In addition to being linked to the display unit 32, the video camera 31 is linked to an image analysis device 37 that is capable of identifying and locating the micro-engravings 16. A device 38 for automatically positioning a centering pin is linked to the device 37, which delivers to the device 38 the coordinates of that place on the face 15 of the ophthalmic lens 14 on which the centering pin must be placed.

The device 38 for automatically positioning a centering pin is for example such as described in French patent application 2 825 466, which corresponds to U.S. Pat. No. 6,888,626.

Generally, it is advantageous for the extended light source 25 and therefore the point light source that it forms with the diaphragm 26, to have a wavelength of between 700 nm and 1000 nm, i.e. in the infrared near the spectrum of visible light.

Thus, the attenuation of the light on its path between the pinhole 27 and the sensor 36 of the video camera 31 is moderated, including when the ophthalmic lens 14 is tinted.

Of course, the sensor 36 of the video camera 31 is chosen to be sensitive in this wavelength range.

Generally, the instrument 10 is here configured for micro-engravings 16 the width of which is between 10 and 80 μm.

It is important that image of the micro-engravings 16 that is projected onto the backscatterer 12 be contrasted. Specifically, this makes it possible to use a video camera 31 with a relatively sizeable aperture of the objective 35. Such an aperture limits the loss of light flux en route to the sensor 36 of the video camera 31.

Thus, enough light flux is received by the sensor 36 of the video camera 31 to allow fluid observation of the micro-engravings 16, i.e. the user may move the ophthalmic lens 14 over the support 13 with the display unit 32 which is refreshed in real time (in practice, at a frequency at least equal to 15 Hz).

It has been observed that with the aforementioned range of wavelengths, a pinhole 27 with a diameter D less than or equal to 1 fiftieth of the focal length F of the collimating lens 30 (distance between the lens 30 and its focus) makes it possible to ensure that the image of the micro-engravings 16 projected onto the backscatterer 12 is contrasted.

It is believed that this results from a good match between the spatial coherence width of the beam 20 and the width of the micro-engravings 16.

Generally, given the aforementioned lower limit of 10 μm for the width of the micro-engravings, it is advantageous for the spatial coherence width of the beam 20 to be larger than or equal to 5 times the width of the micro-engravings 16.

By definition, the spatial coherence width is equal to $F\lambda/D$, where $\lambda$ is the wavelength of the light flux.

If the width of the micro-engravings is denoted a, the following relation is obtained: $D \leq F\lambda/5a$ For example, if:
the width of the micro-engravings is 50 μm;
the wavelength of the light flux is 850 nm; and
the focal length of the collimating lens 30 is 200 mm, then
the diameter D of the pinhole 27 is less than or equal to 680 μm.

It has been observed that excellent results are obtained for micro-engravings 16 having a width a of between 30 μm and 60 μm when the wavelength of the light flux $\lambda$ is between 800 and 900 μm and the focal length F is between 150 and 300 mm.

As indicated above, with a light source 25 emitting at a wavelength of between 700 nm and 1000 nm, and a light-source diameter D of less than or equal to a fiftieth of the focal length F of the collimating lens 30, the image of the micro-engravings 16 projected onto the backscatterer 12 is well contrasted.

Depending on the circumstances, the diameter D is selected to be less than or equal to a hundredth, a hundred and fiftieth, a two hundredth or two hundred and fiftieths of the focal length F.

It has also been observed that parameters favorable for rendering the light flux received by the sensor 36 of the video camera 31 sufficient are:
a high intensity of the light flux emitted through the pinhole 27 of the diaphragm 26; and/or
an aperture of the objective 35 in accordance with the scattering angle of the light scattered by the backscatterer 12 (see FIG. 3 and the right-hand part of FIG. 2).

As shown in FIG. 7 by the arrow 39, to average graininess, the backscatterer 12 is rotated during use of the instrument 10.

It is also possible to place calibrating patterns on the backscatterer 12 (it will be recalled here that the objective 35 of the video camera 31 is focused on the backscatterer 12 and that it is therefore the backscatterer 12 that is seen, moreover whether the ophthalmic lens 14 is present or not), such calibrating patterns no longer being perceptible when the backscatterer is rapidly rotating.

It will be observed that the micro-engravings such as 16 are more precise than the markings carried by the ophthalmic lenses originating from their manufacturers; and that the instrument useful for the comprehension of the invention makes it possible to use the micro-engravings directly, to the benefit of precision.

Such precision, for example for the centering, is important since lenses are becoming ever more personalized.

It will be observed that the instrument 10 can be easily integrated into an already existing instrument, for example a tracer/blocker or a grinder.

It will further be observed that a possible use of the instrument useful for the comprehension of the invention is to measure a possible shift between a reference given by the micro-engravings and other marks present on the lens for example markings with which the lens is delivered; and/or that another possible use of the instrument useful for the comprehension of the invention is to make the markings very precisely with respect to the micro-engravings aided by tracing with the instrument 10.

In the embodiment of the instrument 10 which has just been described, the backscatterer 12 is made up of a solid rotary platen, that is to say one not exhibiting any aperture.

A second embodiment of the optical instrument according to the invention will now be described in support of FIGS. 8 to 13, in which the backscatterer 12 is replaced with a backscatterer in which an aperture is made while a light reception and analysis assembly is disposed under this backscatterer, that is to say on the side of the backscatterer which is opposite to the support 13 designed to receive the ophthalmic lens 14.

The support 13, the aperture in the backscatterer and the light reception and analysis assembly are configured so that the latter receives light from the beam 20 of collimated light after said light has passed through the ophthalmic lens 14 and through the aperture in the backscatterer.

The received light is analyzed to determine certain optical data of the ophthalmic lens 14, in particular the optical center and axis of cylindrical power, which data are of use if the ophthalmic lens 14 is to be edged, or even to determine other data such as the spherical power and cylindrical power of the lens.

Figure 10:
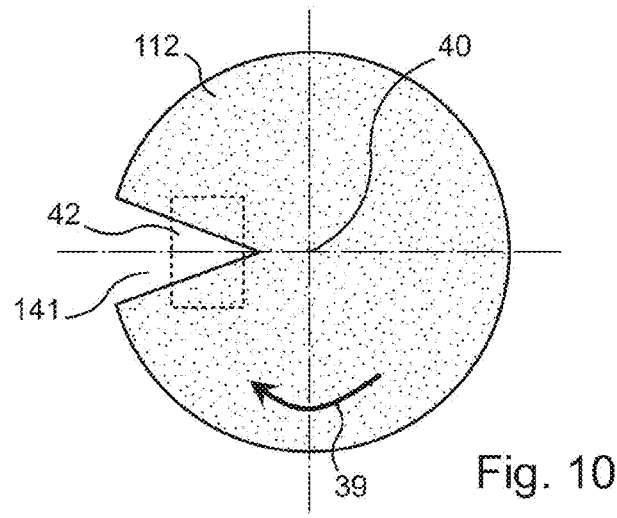
FIG. 10 is a view similar to FIG. 8 but for a first variant of the second embodiment of the optical instrument according to the invention.
Figure 11:
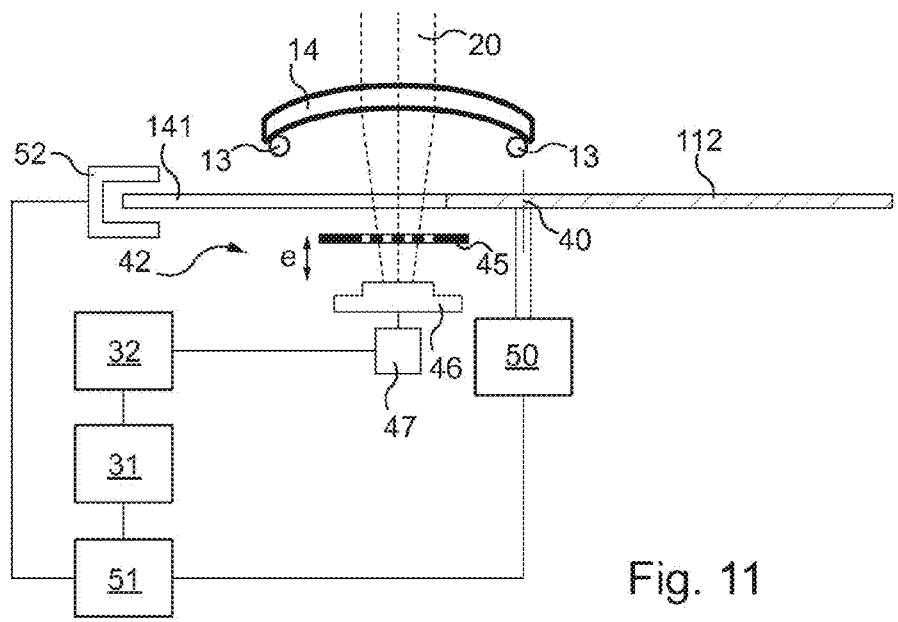
FIG. 11 is a view similar to FIG. 9 but more detailed and corresponding to the first variant illustrated in FIG. 10.
Figure 12:
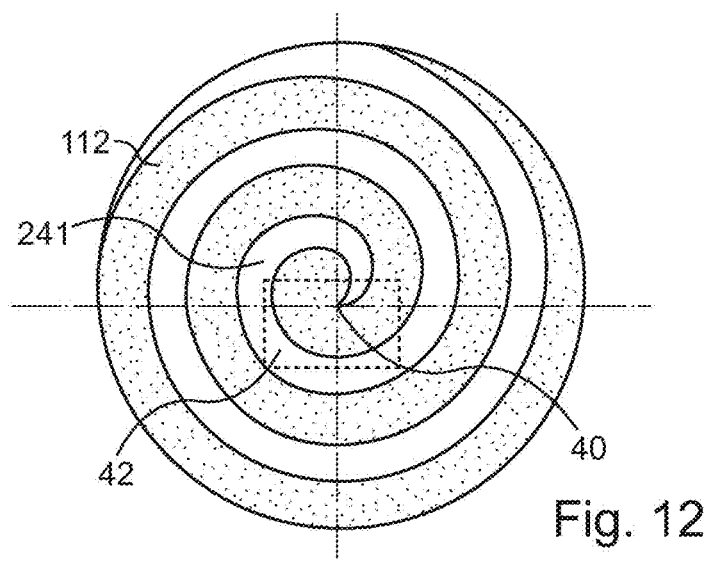
FIG. 12 is a view similar to FIGS. 8 and 10 but for a second variant of the second embodiment of the optical instrument according to the invention.

A first version of the optical instrument according to the second embodiment is illustrated in FIGS. 8 and 9, a second version in FIGS. 10 and 11 and a third version in FIG. 12.

Figure 13:
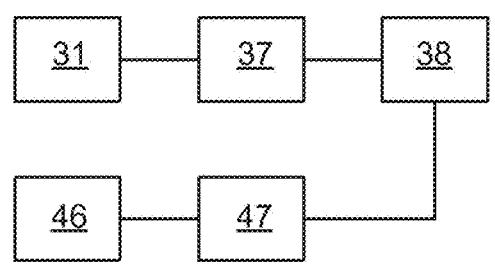
FIG. 13 is a block diagram showing elements linked to the image capture units of the second embodiment of the optical instrument according to the invention.
Figure 14:
FIG. 14 is a block diagram showing elements linked to the light source in a version where it emits flashes.

Elements common to the three versions are illustrated in FIGS. 11, 13 and 14.

In each of the first, second and third versions, the backscatterer 12 is replaced by a backscatterer 112.

Just like the backscatterer 12, the backscatterer 112 has a circular contour centered on the center of rotation 40, but it has an aperture 41, an aperture 141 and an aperture 241, respectively.

In the first version illustrated in FIGS. 8 and 9, the aperture 41 takes the form of an angular sector. It extends from the center of rotation 40 to the periphery of the backscatterer 112.

As may be seen in FIG. 8, the light reception and analysis assembly 42 is placed centered on the center of rotation 40.

As may be seen in FIG. 9, the support 13 for the ophthalmic lens 14 is placed centered with respect to the center of rotation 40.

After light from the beam 20 of collimated light has passed through the ophthalmic lens 14 and through the aperture 41, it reaches the light reception and analysis assembly 42.

As will be understood in light of FIG. 8, at any instant a portion of the light reception and analysis assembly 42 is in line with the aperture 41.

Thus, at any instant, a portion of the light reception and analysis assembly 42 receives light that has passed through the aperture 41.

Because of the rotary movement of the backscatterer 112, each portion of the light reception and analysis assembly 42 is, at a certain moment, in line with the aperture 41 when the backscatterer 112 makes one revolution.

Therefore, at each revolution of the backscatterer 112, the entirety of the light reception and analysis assembly 42 receives light that has passed through the ophthalmic lens 14 and through the aperture 41.

Thus, at each revolution of the backscatterer 112, the light reception and analysis assembly 42 receives light that has passed through the entirety of the corresponding zone of the ophthalmic lens 14.

By analyzing the light received during at least one revolution of the backscatterer 112, the light reception and analysis assembly 42 is able to determine optical data of the lens 14, and more precisely of the zone through which the light passed before reaching the light reception and analysis assembly 42.

Because the center of rotation 40 is not located in the aperture 41 (the center 40 is here on the perimeter of the aperture 41), no part of the aperture 41 is centered on the center of rotation 40.

Therefore, any stationary point facing the backscatterer 112 between its center of rotation 41 and its periphery is in line, during part of each revolution, with a portion of the backscatterer 112 not forming part of the aperture 41, i.e. a solid part.

Here, where the aperture 41 takes the form of an angular sector having its vertex at the center of rotation 40 and an angular aperture of 30°, each stationary point is in line with the aperture 41 during $1/12$ ($30/360$) of a revolution and therefore in line with a portion of the backscatterer 112 not forming part of the aperture 41 during $11/12$ of a revolution.

The images of the backscatterer 112 displayed by the display unit 32 therefore do not contain a void corresponding to the aperture 41 and therefore allow the micro-engravings 16 to be seen in their entirety.

Measure that make it possible to prevent the aperture 41 from appearing at all on the display unit 32 will be described below with reference to FIG. 11 and with reference to FIG. 14.

The second version of the optical instrument according to the second embodiment illustrated in FIGS. 9 and 10 is a variant of the first version in which the aperture 41 is replaced by an aperture 141 that also takes the form of an angular sector, but the vertex of which is a distance away from the center of rotation 40; furthermore, the light reception and analysis assembly 42 is off-center with respect to the center of rotation 40, as is the support 13 provided to receive the ophthalmic lens 14; the support 13 and the light reception and analysis assembly 42 are centered relative to one another.

After light from the beam 20 of collimated light has passed through the ophthalmic lens 14 and through the aperture 141, it reaches the light reception and analysis assembly 42.

As will be understood in light of FIG. 10, at any instant a portion of the light reception and analysis assembly 42 is in line with the aperture 141.

Thus, at any instant, a portion of the light reception and analysis assembly 42 receives light that has passed through the aperture 141.

Because of the rotary movement of the backscatterer 112, each portion of the light reception and analysis assembly 42 is, at a certain moment, in line with the aperture 141 when the backscatterer 112 makes one revolution.

Therefore, at each revolution of the backscatterer 112, the entirety of the light reception and analysis assembly 42 receives light that has passed through the ophthalmic lens 14 and through the aperture 141.

Thus, at each revolution of the backscatterer 112, the light reception and analysis assembly 42 receives light that has passed through the entirety of the corresponding zone of the ophthalmic lens 14.

Because the center of rotation 40 is not located in the aperture 141, no part of the aperture 141 is centered on the center of rotation 40.

For the same reasons as those explained above for the aperture 41, the images of the backscatterer 112 containing the aperture 141 and displayed by the display unit 32 do not contain a void corresponding to the aperture 141 and therefore allow the micro-engravings 16 of the ophthalmic lens 14 to be seen in their entirety.

The third version of the optical instrument according to the second embodiment, which version is illustrated in FIG. 12, is a variant of the first version in which the aperture 41 is replaced by an aperture 241 that is spiral shaped; furthermore, the light reception and analysis assembly 42 is off-center with respect to the center of rotation 40, as is the support 13 provided to receive the ophthalmic lens 14; the support 13 and the light reception and analysis assembly 42 are centered relative to one another.

After light from the beam 20 of collimated light has passed through the ophthalmic lens 14 and through the aperture 241, it reaches the light reception and analysis assembly 42.

As will be understood in view of FIG. 12, at any instant a portion of the light reception and analysis assembly 42 is in line with the aperture 241.

Thus, at any instant, a portion of the light reception and analysis assembly 42 receives light that has passed through the aperture 241.

Because of the rotary movement of the backscatterer 112, each portion of the light reception and analysis assembly 42 is, at a certain moment, in line with the aperture 241 when the backscatterer 112 makes one revolution.

Therefore, at each revolution of the backscatterer 112, the entirety of the light reception and analysis assembly 42 receives light that has passed through the ophthalmic lens 14 and through the aperture 241.

Thus, at each revolution of the backscatterer 112, the light reception and analysis assembly 42 receives light that has passed through the entirety of the corresponding zone of the ophthalmic lens 14.

Because the center of rotation 40 is not located in the aperture 241, no part of the aperture 141 is centered on the center of rotation 40.

For the same reasons as those explained above for the aperture 41, the images of the backscatterer 112 containing the aperture 241 and displayed by the display unit 32 do not contain a void corresponding to the aperture 241 and therefore allow the micro-engravings 16 of the ophthalmic lens 14 to be seen in their entirety.

As may be seen in FIGS. 9 and 11, the light reception and analysis assembly 42 includes a Hartmann matrix 45 and an image sensor 46 placed at a predetermined distance e (FIG. 11) from the Hartmann matrix 45.

The Hartmann matrix 45 is an opaque plate drilled with holes at regular intervals, so that the image captured by the sensor 46 is a matrix of luminous dots each corresponding to one hole of the matrix 45, the locations of these luminous dots depend on the optical characteristics of the ophthalmic lens 14.

Analysis of the image captured by the image sensor 46 therefore makes it possible, for example via the Hartmann or Shack-Hartmann deflectometry method, to determine optical characteristics of the ophthalmic lens 14, especially its optical center, the axis of its cylindrical power, its spherical power, its cylindrical power and other characteristics. For more details, reference may be made for example to French patent application, 2 825 466 which corresponds to the U.S. Pat. No. 6,888,626, or to the international patent application WO 95/34800.

As may be seen in FIG. 11, the image sensor 46 is linked to an image analysis device 47 that is capable of determining the optical characteristics of the ophthalmic lens 14.

The image analysis device 47 is linked to the display unit 32 that may thus display the optical characteristics of the ophthalmic lens 14 as determined by the image analysis device 47.

Thus, as shown in FIG. 13, in the second embodiment of the optical instrument according to the invention, the device 38 for positioning a centering pin is linked not only to the image analysis device 37, but also to the image analysis device 47, this meaning that the device 38 for automatically positioning a centering pin may ascertain the coordinates of the place on the face 15 of the ophthalmic lens 14 on which the centering pin must be placed not only by way of the micro-engravings 16 but also by way of the optical characteristics of the lens 14.

FIG. 11 schematically shows the device 50 for driving the backscatterer 122 to rotate, which device is configured to make the backscatterer 122 turn about the center of rotation 40.

With reference to FIG. 11, it will now be explained how it is possible to prevent a void corresponding to an aperture such as 41, 141 or 241 from appearing on the display unit 32.

The video camera 31 and the device 50 for driving the backscatterer 112 in rotation are linked to a control device 51 configured so that each time interval during which the video camera 31 takes an image corresponds to an integer number of revolution(s) of the backscatterer 112.

In the illustrated example, each image is taken during 1/20 s and the backscatterer 112 makes one revolution in 1/20 s, i.e. a speed of 1200 revolutions/min.

As explained above, because the center of rotation 40 is not located in an aperture such as 41, 141 or 241, no part of these apertures is centered on the center of rotation 40.

Therefore, any stationary point facing the backscatterer 112 between its center of rotation 40 and its periphery is in line, during part of each revolution, with a portion of the backscatterer 112 not forming part of the aperture (solid portion).

Likewise, each pixel of the sensor 36 of the video camera 31 receives, during part of each revolution, light from a portion of the backscatterer 112 not forming part of the aperture.

As each image is taken during one or more entire revolutions of the backscatterer 112, each pixel receives the same proportion of light coming from the portion of the backscatterer 112 not forming part of the aperture such as 41, 141 or 241.

Each image taken by the video camera 31 therefore does not include a void corresponding to an aperture such as 41, 141 or 241.

The operator looking at the display unit 32 perceives the same images as with the solid backscatterer 12, except that all or part of the backscatterer 112 appears less bright.

For example, for the backscatterer 112 having the aperture 41 shown in FIGS. 8 and 9, the perceived brightness for the backscatterer 112 in its entirety is 11/12 of the perceived brightness for the backscatterer 12, all other things being equal.

The backscatterer 112 having the aperture 41 shown in FIGS. 8 and 9 is thus perceived as an entirely solid backscatterer (just like the backscatterer 12) while still letting light pass to the light reception and analysis unit 42.

For the backscatterer 112 having the aperture 141 shown in FIGS. 10 and 11, a central portion, the radius of which corresponds to the distance between the center of rotation 40 and the vertex of the aperture 141, is perceived with the same brightness as the backscatterer 12 whereas the rest of the backscatterer 112 is perceived to be less bright.

In all cases, the image of the backscatterer 112 allows the micro-engravings 16 to be seen in their entirety.

The implementation of the control device 51 for example involves a common time-base for controlling the video camera 31 and the rotation-driving device 50.

In the example illustrated in FIG. 11, provision is also made for a detector 52 for ascertaining the position of the backscatterer 112 in order to allow its speed of rotation to be automatically controlled.

As a variant, as illustrated in FIG. 14, rather than providing a control device such as 51 to control the video camera 31 and the device 50 for driving the backscatterer 12 in rotation, provision is made for a device 55 linked to the device 50 for driving the backscatterer 112 in rotation and to the extended light source 25 of the point light source formed by the extended light source 25 and by the diaphragm 26.

The control device 55 is configured to make the light source 25 emit flashes, each time interval during which the light source 25 emits a flash corresponding to an integer number of revolution(s) of the backscatterer 112.

For example, if the backscatterer 112 turns at a speed of 1200 revolutions/min, and therefore makes one revolution every 1/20 s, each flash has a duration of 1/20 s or of a multiple of 1/20 s.

Since no light is emitted between the flashes, only the moments when a flash is emitted appear on the display unit 32.

As each moment in which an image appears on the display unit 32 lasts one or more entire revolutions of the backscatterer 112, each displayed image contains no void corresponding to an aperture such as 41, 141 or 241.

The operator looking at the display unit 32 sees the same images as with the control device such as 51, except that the images have a brightness that oscillates in tempo with the flashes emitted by the light source 25.

The implementation of the control device 55 for example involves a common time-base for controlling the flashes of the light source 25 and the rotation-driving device 50.

Generally, a suitable range of rotation for the backscatterer 12 or the backscatterer 112 is between 600 and 5000 revolutions/min.

Figure 15:
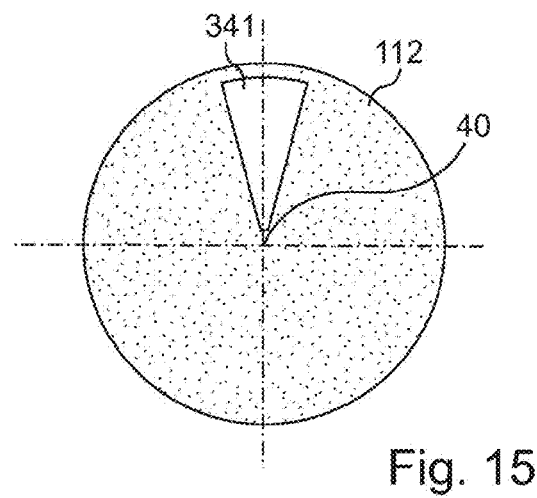
FIG. 15 is a view similar to FIGS. 8, 10 and 12 but for a third variant of the second embodiment of the optical instrument.

The fourth version, illustrated in FIG. 15, of the optical instrument according to the second embodiment is a variant of the second version (FIGS. 10 and 11) in which the aperture 141 is replaced with an aperture 341 not going as far as the periphery of the backscatterer 112.

More precisely, the aperture 341 is in the shape of an angular sector whose vertex is offset from the center of rotation 40 and whose circular-arc-shaped side is offset from the periphery of the backscatterer 112.

Figure 16:
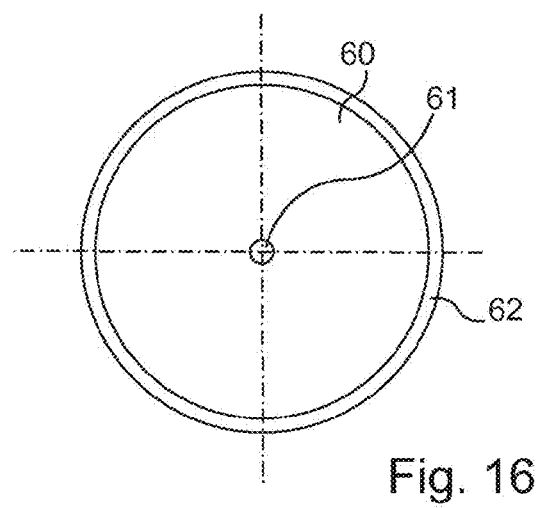
FIG. 16 shows the various parts comprised by a fixed zone facing the backscatterer illustrated in FIG. 15.

FIG. 16 shows the various parts comprised by a fixed zone facing the backscatterer 112.

This entails an annular part 60, a disc-shaped part 61 which is surrounded by the part 61 and an annular part 62 which surrounds the part 60.

Each site of the part 60 is situated in the course of a revolution of the backscatterer 112, at times in line with the aperture 341 and at times in line with a solid part of the backscatterer 112.

Each site of the part 61 and each site of the part 62 is permanently in line with a solid part of the backscatterer 112.

The circle-shaped contour of the part 61 has a radius corresponding to the offset between the center of rotation 40 and the vertex of the aperture 341.

The inner contour of the part 62 has a radius which is that of the circular-arc-shaped side of the aperture 341. The outer contour of the part 62 has a radius which is that of the backscatterer 112.

The inner contour of the part 60 corresponds to the contour of the part 61. The outer contour of the part 60 corresponds to the inner contour of the part 62.

If the fixed zone facing the backscatterer 112 of FIG. 15 is on the side of the light reception and analysis assembly 42:
neither the part 61 nor the part 62 are traversed by light heading towards the light reception and analysis assembly 42; and
the part 60 comprises at any instant a sub-part which is in line with a solid part of the backscatterer 112 and a sub-part which is in line with the aperture 341.

The sub-part which is in line with a solid part of the backscatterer 112 is not traversed by light heading towards the light reception and analysis assembly 42.

The sub-part which is in line with the aperture 341 is traversed by light heading towards the light reception and analysis assembly 42.

If the light reception and analysis assembly 42 is disposed in the part 60, at each revolution of the backscatterer 112, the entirety of the light reception and analysis assembly 42 receives light that has passed through the ophthalmic lens 14 and through the aperture 341.

Thus, at each revolution of the backscatterer 112, the light reception and analysis assembly 42 receives light that has passed through the entirety of the corresponding zone of the ophthalmic lens 14.

If the fixed zone facing the backscatterer 112 of FIG. 15 is on the side of the support 13:
the part 61 and the part 62 are traversed permanently by light heading towards the light emission and reception assembly 11; and
the part 60 comprises at any instant a sub-part which is in line with a solid part of the backscatterer 112 and a sub-part which is in line with the aperture 340.

The sub-part which is in line with a solid part of the backscatterer 112 is traversed by light heading towards the light emission and reception assembly 11.

The sub-part which is in line with the aperture 341 is not traversed by light heading towards the light emission and reception assembly 11, or else by light of low intensity.

The images of the backscatterer 112 which are taken by the sensor 36 of the video camera 31 have, as regards brightness, the same aspect as FIG. 16, with at the center and at the periphery more luminous zones corresponding to the part 61 and to the part 62 and, between these parts, a slightly less luminous part corresponding to the part 60.

It will be observed that for the rear view mirror 112 having the aperture 41 (FIG. 8), there exists only a part such as 60 since the vertex of the aperture 41 is on the center of rotation 40 (there is therefore no part such as 61) and since the aperture 41 goes as far as the edge of the backscatterer 112 (there is therefore no part such as 62).

Likewise, for the backscatterer 112 having the aperture 141 (FIG. 10, there is no part such as 62 but only a part such as 61 and a part such as 60.

Figure 17:
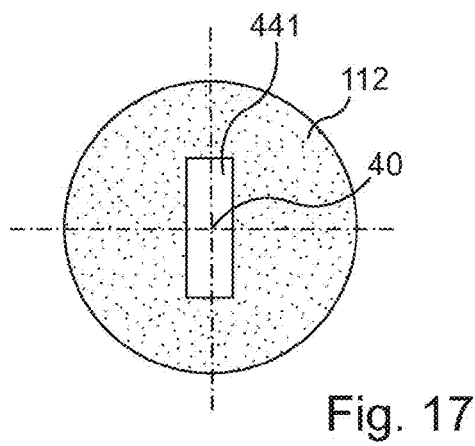
FIG. 17 is a view similar to FIGS. 8, 10, 12 and 15, but for a fourth variant of the second embodiment of the optical instrument.

The fifth version, illustrated in FIG. 17, of the optical instrument according to the second embodiment is a variant of the first version (FIG. 8) in which the aperture 41 is replaced with a rectangle-shaped aperture 441 with the same center as the center of rotation 40, whose sides are not equal: the sides oriented vertically in FIG. 17 are larger than the sides oriented horizontally in FIG. 17.

Figure 19:
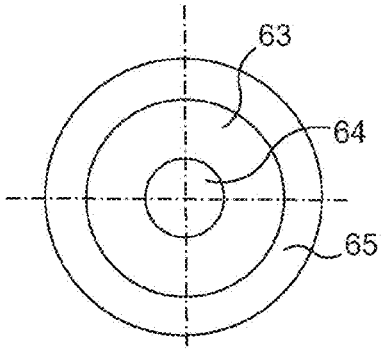
FIG. 19 is a view similar to FIG. 16 but for the backscatterer of FIG. 17.

FIG. 19 shows the various parts comprised by a fixed zone facing the backscatterer 112 of FIG. 17.

This entails an annular part 63, a disc-shaped part 64 which is surrounded by the part 63 and an annular part 65 which surrounds the part 63.

Each site of the part 63 is situated in the course of a revolution of the backscatterer 112, at times in line with the aperture 441 and at times in line with a solid part of the backscatterer 112.

Each site of the part 64 is permanently in line with the aperture 441.

Each site of the part 65 is permanently in line with a solid part of the backscatterer 112.

Figure 18:
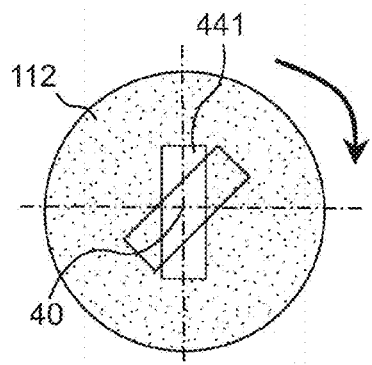
FIG. 18 is a view similar to FIG. 17 but also showing another position taken by the backscatterer in the course of its rotation.

As is well understood in view of FIG. 18, the circle-shaped contour of the part 64 has a diameter which is the length of one of the small sides of the aperture 441; the inner contour of the part 65 has a diameter which is on the diagonal of the aperture 441; and the outer contour of the part 65 has a diameter which is that of the backscatterer 112.

It will be noted that the part 63 exists because the aperture 441 is not asymmetric about the center of rotation 40.

In relation to the light reception and analysis assembly 42 and in relation to the light emission and reception assembly 11, the parts 63 and 65 behave like respectively the part 60 and the part 61 or 62 of the fixed zone shown in FIG. 16.

On the other hand, as each site of the part 64 is permanently in line with the aperture 441:
if the fixed zone is on the side of the light reception and analysis assembly 42, the part 64 is traversed permanently by light heading towards the light reception and analysis assembly 42; and
if the fixed zone is on the side of the support 13, the part 64 is not traversed by light heading towards the light emission and reception assembly 11, or else is traversed by light of low intensity.

The images of the backscatterer 112 taken by the sensor 36 of the video camera 31 have, as regards brightness, the same aspect as FIG. 19, with at the center a dark zone corresponding to the part 64, a more luminous zone at the periphery corresponding to the part 65 and, between these parts, a slightly less luminous zone corresponding to the part 63.

In a general manner, to allow good tracing of the micro-engravings 16, or anyway of the predetermined indications of some other nature liable to be present on the ophthalmic lens so as to give the location of at least one characteristic point, it is desirable that the part such as 64 be non-existent or as small as possible, for example no larger than 100 mm$^2$.

It will be noted that the part 64 is present because the center of rotation 40 is in the aperture 41.

In all the exemplary embodiments illustrated and described hereinabove, the backscatterer 112 can rotate continuously about the center of rotation 40.

It will be observed that the rotation-driving device 50 is a cyclic driving device, making the backscatterer 112 make one and the same motion at each cycle, that is to say a complete revolution about the center of rotation 40.

Figure 20:
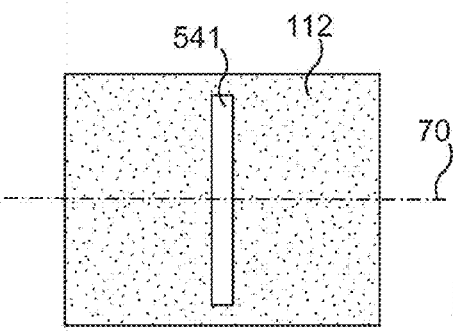
FIG. 20 is a view similar to FIG. 7 but for a third embodiment of the optical instrument, which is according to the invention.

In the third embodiment of the optical instrument illustrated in FIG. 20, the backscatterer 112 driven in rotation in a continuous manner about the center of rotation 40 is replaced with a backscatterer 112 which is translated in a to-and-fro movement along the direction 70.

Figure 21:
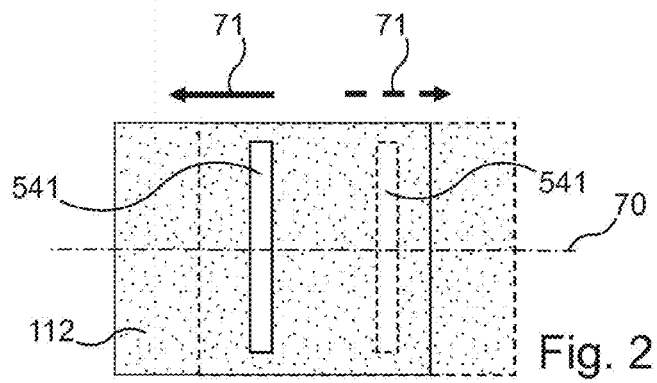
FIG. 21 is a view similar to FIG. 20 but simultaneously showing the two extreme positions taken by the backscatterer in the course of a to-and-fro movement.

This device for driving in a to-and-fro movement is symbolized in FIG. 21 by the arrows 71.

FIG. 21 shows as a solid line one of the extreme positions of the to-and-fro motion and, as a dashed line, the other extreme position.

Here, the backscatterer 112 has a rectangular contour and exhibits an aperture 541 which has the same center as the backscatterer 112, and is relatively narrow.

Figure 22:
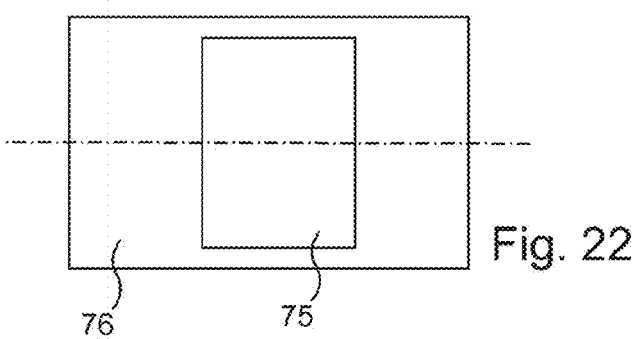
FIG. 22 is a view similar to FIGS. 16 and 19, but for the backscatterer of FIG. 20.

FIG. 22 shows like FIGS. 16 and 19 the various parts comprised by a fixed zone facing the backscatterer 112 of FIG. 20.

This entails a rectangular part 75 and a part 76 whose inner contour corresponds to that of the part 75 and whose outer contour is rectangular.

In the course of an outward-return movement of the backscatterer 112, each site of the part 75 is situated at times in line with the aperture 541 and at times in line with a solid part of the backscatterer 112.

Each site of the part 76 is permanently in line with a solid part of the backscatterer 112.

Thus, the part 75 behaves in a similar manner to the part 60 (FIG. 16) or to the part 63 (FIG. 19) while the part 76 behaves in a similar manner to the part 61 or 62 (FIG. 16) and to the part 65 (FIG. 19).

In a variant, not illustrated, the device for cyclic driving of the backscatterer is configured to translate it along a predetermined direction but in a continuous manner rather than in an alternating manner (to-and-fro movement). For example, the backscatterer is carried by an endless belt running around several rollers.

In another variant not illustrated, the backscatterer is driven in rotation but in an alternating rather than continuous manner, by performing to-and-fro movements of a predetermined angular amplitude.

In variants, not illustrated, the light backscatterer is replaced with a light unit of another nature, for example a retroreflector.

In this case, the objective such as 35 of the camera such as 31 is focused on the lens 14 rather than on the light return unit.

In variants, not illustrated, the micro-engravings 16 are replaced with other predetermined indications present on the lens 14 so as to give the location of at least one characteristic point such as the Prism Reference Point (PRP), for example erasable ink markings.

In variants, not illustrated, the light emission and reception assembly 11 is different, with for example with the incident beam 20 which is not a collimated light beam and/or the light source which is different from the point source formed by the extended source 25 and by the diaphragm 26, for example directly an extended light source.

Figure 23:
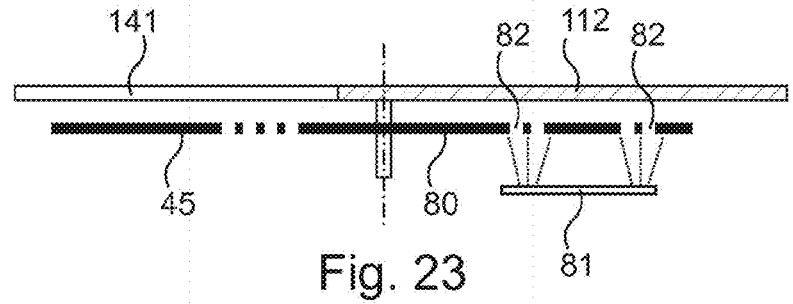
FIG. 23 is a schematic sectional view in elevation, showing the backscatterer illustrated in FIGS. 10 and 11 as well as a light source configured to emit light destined for the light reception and emission assembly and a mask exhibiting holes through which this light passes.

FIG. 23 shows a variant of the light reception and analysis assembly 42 illustrated in FIG. 11 in which the HARTMANN matrix 45 is not isolated but forms part of a more extended mask 80 while the assembly 42 also comprises a light source 81 disposed facing holes 82 in the mask 80.

The light emitted by the light source 81 passes through the holes 82, the aperture 141 and heads towards the light emission and reception assembly 11 where it is received by the sensor 35 of the video camera 31.

Figure 24:
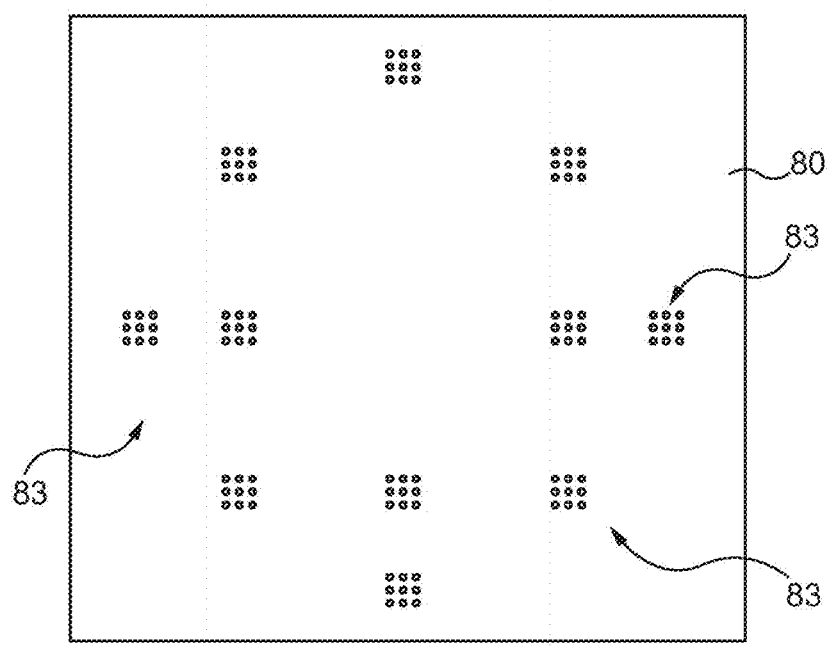
FIG. 24 is a plan view showing a variant of the mask illustrated in FIG. 23.

The holes 82 can for example form predetermined patterns 83, as shown in FIG. 24, here a cross-grid of three holes by three holes, serving to perform a calibration of the optical instrument.

It will be noted that in FIG. 24, to simplify the drawing, the HARTMANN matrix 45 has not been represented.

Figure 25:
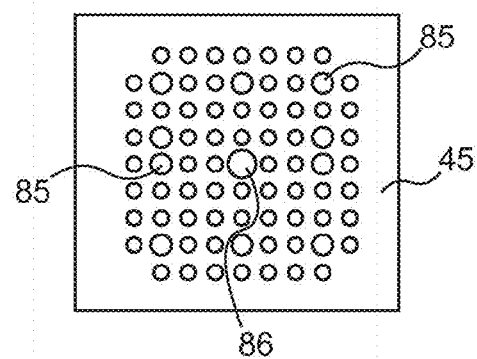
FIG. 25 is a plan view showing a variant of the organization of the holes of the matrix of patterns of the light reception and analysis assembly.

FIG. 25 shows a variant of the organization of the holes of the HARTMANN matrix 45, in which certain holes 85 and 86 are bigger so as to improve the analysis capabilities in respect of the light passing through this HARTMANN matrix 45.

In a variant, not illustrated, the HARTMANN matrix 45 is replaced with another matrix of patterns making it possible to determine the characteristic points of the ophthalmic lens 14, and more generally to determine other characteristics of this lens such as its spherical power, its cylindrical power and its cylindrical power axis.

In variants, not illustrated, the light reception and analysis assembly 42 is capable of determining other optical characteristics, for example a polarization axis of the lens 14.

Many other variants are possible depending on the circumstances and it will be recalled, in this respect, that the invention is not limited to the examples described and represented.

The invention claimed is:

1. An optical instrument for charting at least one characteristic point of an ophthalmic lens (14), comprising:
    a light emission and reception assembly (11), comprising an image capture unit (35) and an image utilization unit (32) linked to the image capture unit;
    a light return unit;
    a support (13) configured to receive said ophthalmic lens (14) between said light emission and reception assembly (11) and said light return unit, with said light emission and reception assembly (11), said support (13) and said light return unit which are disposed so that an incident light beam (20) issuing from said light emission and reception assembly (11) passes through said ophthalmic lens (14), encounters said light return unit (12), returns towards said ophthalmic lens, passes once again through said ophthalmic lens (14) and returns to said light emission and reception assembly (11) so as to reach the image capture unit (35), which is configured to provide the image utilization unit (32) with images so as to identify and locate predetermined indications liable to be present on the ophthalmic lens so as to give the location of said at least one characteristic point;

an aperture made in said light return unit; and a light reception and analysis assembly (42), situated on the side of the light return unit opposite to said support (13), with said support (13), said light return unit and said aperture which are configured so that said light reception and analysis assembly (42) receives light, from said incident beam (20), that has passed through said ophthalmic lens and through said aperture, said light reception and analysis assembly (42) being configured to chart said at least one characteristic point of the ophthalmic lens (14) on the basis of the light received;

wherein said aperture (41; 141; 241; 341; 441; 541) and a device (50; 71) for cyclic driving of the light return unit (112), making the light return unit (112) make one and the same motion at each cycle, are configured so that a fixed zone facing the light return unit (112) comprises at least one part (60; 63; 75), each site of which, in the course of a cycle, is at times in line with said aperture (41; 141; 241; 341; 441; 541) and at times in line with a solid part of the light return unit (112).

2. The instrument as claimed in claim 1, wherein said aperture (41; 141; 241; 341; 541) and said device (50; 71) for cyclic driving of the light return unit (112) are configured so that said fixed zone facing the light return unit (112) does not comprise any part which, in the course of a cycle, is permanently in line with said aperture (41; 141; 241; 341; 541).

3. The instrument as claimed in claim 2, wherein the device (50) for cyclic driving of the light return unit (112) is configured to rotate the light return unit (112) about a predetermined center of rotation (40); and said aperture (41; 141; 241; 341) is configured so that the center of rotation (40) of the light return unit (112) is elsewhere than in the aperture (41; 141; 241; 341).

4. The instrument as claimed in claim 3, wherein said light return unit (112) has a circular contour and said aperture (41; 141; 341) is angular-sector-shaped.

5. The instrument as claimed in claim 3, wherein said light return unit (112) has a circular contour and said aperture (241) is spiral-shaped.

6. The instrument as claimed in claim 2, wherein the device (71) for cyclic driving of the light return unit (112) is configured to translate the light return unit to-and-fro along a predetermined direction (70).

7. The instrument as claimed in claim 1, wherein the device (50) for cyclic driving of the light return unit (112) is configured to rotate the light return unit (112) about a predetermined center of rotation (40); and said aperture (41; 141; 241; 341) is configured so that the center of rotation (40) of the light return unit (112) is elsewhere than in the aperture (41; 141; 241; 341).

8. The instrument as claimed in claim 7, wherein said light return unit (112) has a circular contour and said aperture (41; 141; 341) is angular-sector-shaped.

9. The instrument as claimed in claim 7, wherein said light return unit (112) has a circular contour and said aperture (241) is spiral-shaped.

10. The instrument as claimed in claim 1, wherein the device (50) for cyclic driving of the light return unit (112) is configured to rotate the light return unit (112) about a predetermined center of rotation (40); and said aperture (441) is configured so that the center of rotation (40) of the light return unit (112) is in the aperture (441) whilst the contour of the aperture is other than axisymmetric about the center of rotation (40).

11. The instrument as claimed in claim 1, wherein the device (71) for cyclic driving of the light return unit (112) is configured to translate the light return unit to-and-fro along a predetermined direction (70).

12. The instrument as claimed in claim 11, wherein the light return unit (112) has rectangular contour and said aperture (541) is rectangle-shaped.

13. The instrument as claimed in claim 1, wherein the device (50) for cyclic driving of the light return unit (112) and the image capture unit (31) comprised by said light emission and reception assembly (11), are linked to a control device (51) configured so that each time interval during which the image capture unit (31) takes an image has a duration for which the light return unit (112) makes an integer number of cycle(s).

14. The instrument as claimed in claim 1, wherein the device (50) for cyclic driving of the light return unit (112) and a light source (25-27) comprised by said light emission and reception assembly (11), are linked to a control device (55) configured to make said light source (25-27) emit flashes each having a duration for which the light return unit (112) makes an integer number of cycle(s).

15. The instrument as claimed in claim 1, wherein said light reception and analysis assembly (42) comprises a device (45-47) for measuring deflection of said light, of the incident beam (20), that has passed through said ophthalmic lens (14) and through said aperture (41; 141; 241; 341; 441; 541).

16. The instrument as claimed in claim 1, wherein said light reception and analysis assembly (42) comprises a matrix of patterns (45) that is illuminated by said light, of the incident beam (20), that has passed through said ophthalmic lens (14) and through said aperture (41; 141; 241), another image capture unit (46) illuminated by the light that has passed through the matrix of patterns (45), and an analysis device (47) for analysing the images captured by said other image capture unit (46) so as to chart said at least one characteristic point of the ophthalmic lens (14).

17. The instrument as claimed in claim 16, wherein said analysis device (47) for analysing the images captured by said other image capture unit (46) is linked to a display unit (32) for displaying said at least one characteristic point of the ophthalmic lens (14).

18. The instrument as claimed in claim 17, wherein said analysis device (47) for analysing the images captured by said other image capture unit (46) is linked to a device (38) for automatic positioning of a centering pin on said ophthalmic lens (14).

19. The instrument as claimed in claim 16, wherein said analysis device (47) for analysing the images captured by said other image capture unit (46) is linked to a device (38) for automatic positioning of a centering pin on said ophthalmic lens (14).

20. The instrument as claimed in claim 1, wherein said light reception and analysis assembly (42) furthermore comprises a light source (81) configured to emit light which passes through said aperture (41; 141; 241; 341; 441; 541) and is received by said light emission and reception assembly (11); and said light reception and analysis assembly (42) comprises a mask (80) exhibiting holes (82) forming at least one predetermined pattern (83), holes (82) through which said light emitted by said light source (81) comprised by said light reception and analysis assembly (42) passes.

* * * * *